(12) United States Patent
Recio

(10) Patent No.: US 11,976,981 B2
(45) Date of Patent: May 7, 2024

(54) TEMPERATURE SENSING ASSEMBLY FOR A COOKTOP APPLIANCE

(71) Applicant: Haier US Appliance Solutions, Inc., Wilmington, DE (US)

(72) Inventor: Steven Michael Recio, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 247 days.

(21) Appl. No.: 17/471,428

(22) Filed: Sep. 10, 2021

(65) Prior Publication Data

US 2023/0079379 A1 Mar. 16, 2023

(51) Int. Cl.
| | |
|---|---|
| *G01K 1/14* | (2021.01) |
| *H05B 3/74* | (2006.01) |
| *H05B 6/06* | (2006.01) |
| *H05B 6/12* | (2006.01) |

(52) U.S. Cl.
CPC .............. *G01K 1/146* (2013.01); *H05B 3/74* (2013.01); *H05B 6/062* (2013.01); *H05B 6/1209* (2013.01); *G01K 2207/00* (2013.01); *H05B 2213/07* (2013.01)

(58) Field of Classification Search
CPC ...... G01K 1/146; G01K 2207/00; H05B 3/74; H05B 6/1209; H05B 6/062; H05B 2213/05; H05B 2213/07
See application file for complete search history.

(56) References Cited

U.S. PATENT DOCUMENTS

| | | | |
|---|---|---|---|
| 6,949,723 B2 | 9/2005 | Platt | |
| 2006/0289489 A1* | 12/2006 | Wang | ..................... H05B 6/062 |
| | | | 219/622 |
| 2013/0255658 A1 | 10/2013 | Shaffer | |
| 2020/0208843 A1* | 7/2020 | Johnson | .............. H04L 12/4625 |
| 2021/0010677 A1* | 1/2021 | Johnson | .................. F24C 3/126 |
| 2021/0277496 A1* | 9/2021 | Meng | ................... B23K 26/034 |

FOREIGN PATENT DOCUMENTS

WO       WO2008101766 A1     8/2008

* cited by examiner

*Primary Examiner* — Dana Ross
*Assistant Examiner* — Kuangyue Chen
(74) *Attorney, Agent, or Firm* — Dority & Manning, P.A.

(57) ABSTRACT

A cooktop appliance includes a cooktop panel defining a cooktop surface and an aperture defined through the cooktop surface. A heating element is positioned below the cooktop panel for selectively heating a cooking utensil placed on the cooktop surface and a temperature sensing assembly is configured for monitoring the temperature of the cooking utensil, e.g., to facilitate a closed loop cooking process. The temperature sensing assembly includes a temperature sensor slidably mounted within the aperture of the cooktop panel and a drive member operably coupled to the temperature sensor for selectively moving the temperature sensor between the extended position and the retracted position.

14 Claims, 3 Drawing Sheets

TEMPERATURE SENSING ASSEMBLY FOR A COOKTOP APPLIANCE

FIELD OF THE INVENTION

The present subject matter relates generally to oven appliances, and more particularly, to retractable temperature sensor assemblies for oven appliances.

BACKGROUND OF THE INVENTION

Cooking appliances, e.g., cooktops or ranges (also known as hobs or stoves), generally include one or more heated portions for heating or cooking food items within or on a cooking utensil placed on the heated portion. For instance, induction cooktops commonly include a glass cooking panel with an induction heating element positioned below the cooking panel. A controller may regulate the operation of the heating element based on a position of a control knob or based on the temperature of the cooking utensil to achieve a target cooking temperature.

One or more temperature sensors may be used to measure or track the temperature of the cooking utensil during a cooking operation, e.g., to facilitate a closed loop cooking process. For example, conventional temperature sensors are spring-loaded temperature sensors that pass through the cooking panel for measuring the temperature of the cooking utensil while heating. These sensors protrude above the cooking surface and are deflected when a cooking utensil is placed on the heating element. However, these temperature sensors commonly collect spills or cooking residue. In addition, these temperature sensors are unsightly and can be easily damaged by cooking utensils that are not carefully placed on top of the protruding sensor, which may generate lateral forces. Other temperature sensors are possible, such as infrared sensors or wireless smart pans, but these sensors are expensive, are prone to inaccurate measurements, and/or require additional steps for proper use.

Accordingly, an oven appliance with an improved temperature sensing system is desirable. More specifically, a temperature sensing assembly that is cost effective, accurate, and eliminates one or more of the above-mentioned drawbacks would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a cooktop appliance defining a vertical direction, a lateral direction, and a transverse direction is provided. The cooktop appliance includes a cooktop panel defining a cooktop surface configured to support a cooking utensil and an aperture defined through the cooktop surface, a heating element positioned below the cooktop panel for selectively heating the cooking utensil, and a temperature sensing assembly. The temperature sensor includes a temperature sensor slidably mounted within the aperture of the cooktop panel and being movable between an extended position and a retracted position and a drive member operably coupled to the temperature sensor for selectively moving the temperature sensor between the extended position and the retracted position.

In another exemplary embodiment, a temperature sensing assembly for a cooktop appliance is provided. The cooktop appliance includes a cooktop panel defining a cooktop surface configured to support a cooking utensil and an aperture defined through the cooktop surface. The temperature sensing assembly includes a temperature sensor slidably mounted within the aperture of the cooktop panel and being movable between an extended position and a retracted position and a drive member operably coupled to the temperature sensor for selectively moving the temperature sensor between the extended position and the retracted position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
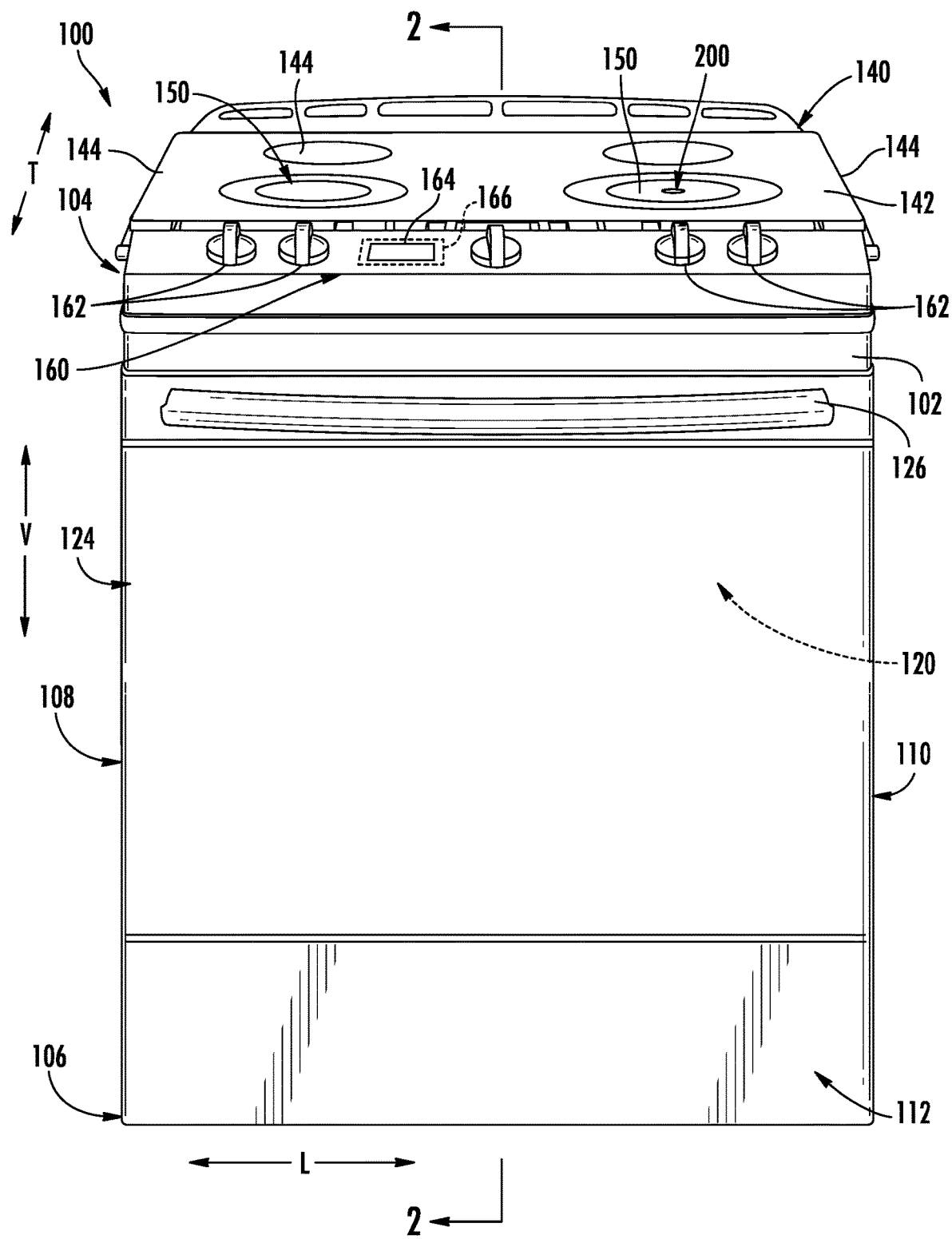
FIG. 1 provides a front perspective view of a cooking appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, perspective view of an oven appliance 100 as may be employed with the present subject matter. Oven appliance 100 generally defines a vertical direction V, a lateral direction L, and a transverse direction T, each of which is mutually perpendicular, such that an orthogonal coordinate system is generally defined. As illustrated, oven appliance 100 includes an insulated cabinet 102. Cabinet 102 of oven appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a single cooking chamber 120 which is configured for the receipt of one or more food items to be cooked. However, it should be appreciated that oven appliance 100 is provided by way of example only, and aspects of the present subject matter may be used in any suitable cooking appliance, such as a double oven range appliance. Thus, the example embodiment shown in FIG. 1 is not intended to limit the present subject matter to any particular cooking chamber configuration or arrangement. Indeed, aspects of the present subject matter may be applied to any suitable cooktop appliance.

Oven appliance 100 includes a door 124 rotatably attached to cabinet 102 in order to permit selective access to cooking chamber 120. Handle 126 is mounted to door 124 to assist a user with opening and closing door 124 in order to access cooking chamber 120. As an example, a user can pull on handle 126 mounted to door 124 to open or close door 124 and access cooking chamber 120. One or more transparent viewing windows 128 (FIG. 1) may be defined within door 124 to provide for viewing the contents of cooking chamber 120 when door 124 is closed and also assist with insulating cooking chamber 120.

Figure 2:
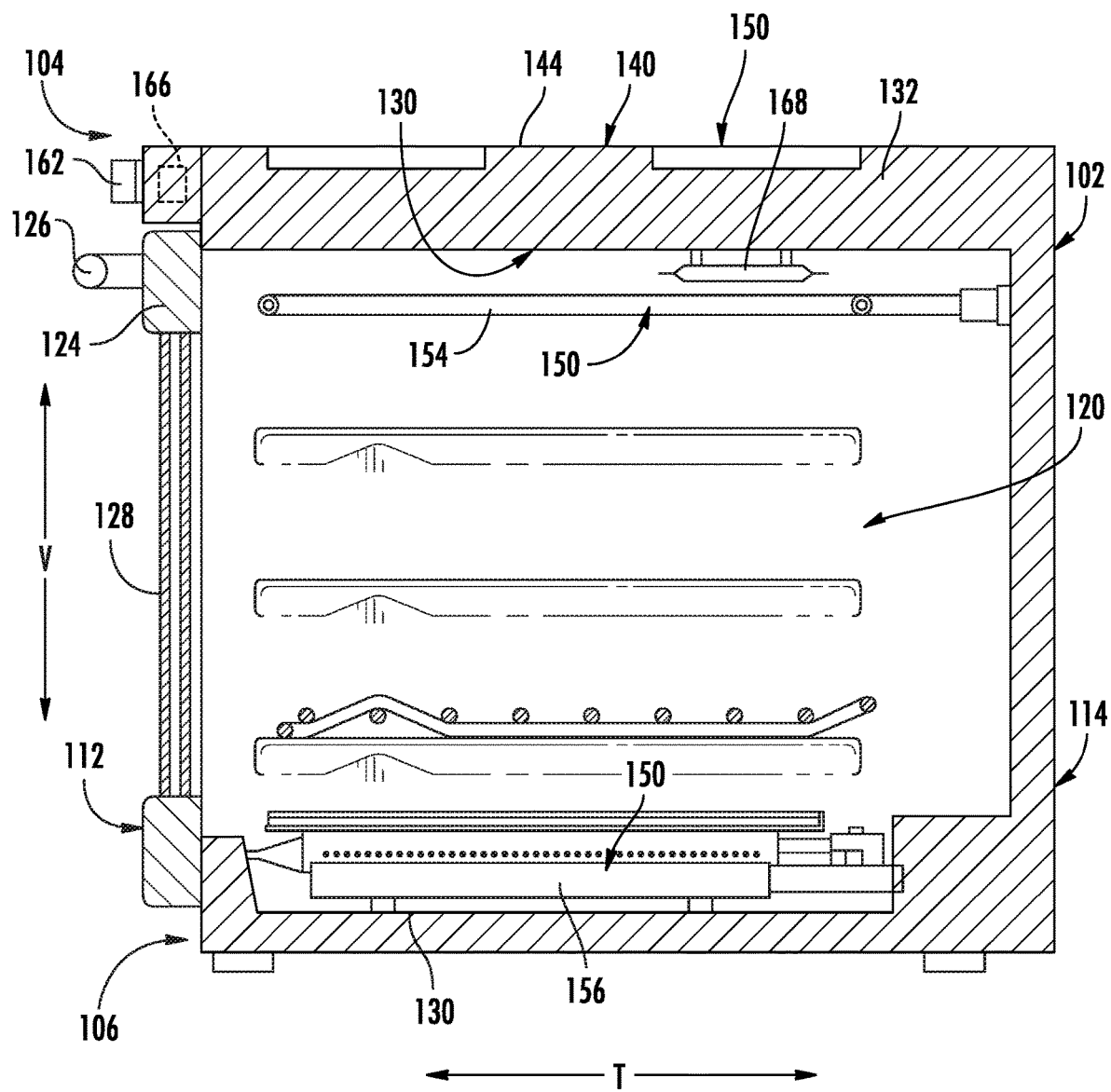
FIG. 2 provides a side cross sectional view of the exemplary cooking appliance of FIG. 1 according to an exemplary embodiment of the present subject matter.

In general, cooking chamber 120 is defined by a plurality of chamber walls 130 (FIG. 2). Specifically, cooking chamber 120 may be defined by a top wall, a rear wall, a bottom wall, and two sidewalls 130. These chamber walls 130 may be joined together to define an opening through which a user may selectively access cooking chamber 120 by opening door 124. In order to insulate cooking chamber 120, oven appliance 100 includes an insulating gap defined between the chamber walls 130 and cabinet 102. According to an exemplary embodiment, the insulation gap is filled with an insulating material 132, such as insulating foam or fiberglass, for insulating cooking chamber 120.

Oven appliance 100 also includes a cooktop 140. Cooktop 140 is positioned at or adjacent top 104 of cabinet 102 such that it is positioned above cooking chamber 120. Specifically, cooktop 140 includes a top panel 142 positioned proximate top 104 of cabinet 102. By way of example, top panel 142 may be constructed of glass, ceramics, enameled steel, and combinations thereof. For example, according to the illustrated embodiment, cooktop includes a ceramic glass panel 144 having a plurality of cooking zones.

Oven appliance 100 may further include one or more heating elements (identified generally by reference numeral 150) for selectively heating cooking utensils positioned on glass panel 144 or food items positioned within cooking chamber 120. For example, referring to FIG. 1, heating elements 150 may be electric burners 150. Specifically, a plurality of electric burners 150 are mounted within or on top of top panel 142 underneath a glass panel 144 that supports cooking utensils over the electric burners 150 while electric burners 150 provide thermal energy to cooking utensils positioned thereon, e.g., to heat food and/or cooking liquids (e.g., oil, water, etc.). Electric burners 150 can be configured in various sizes so as to provide e.g., for the receipt of cooking utensils (i.e., pots, pans, etc.) of various sizes and configurations and to provide different heat inputs for such cooking utensils. According to alternative embodiments, oven appliance 100 may have other cooktop configurations or burner elements.

In addition, heating elements 150 may be positioned within or may otherwise be in thermal communication with cooking chamber 120 for regulating the temperature within cooking chamber 120. Specifically, an upper gas heating element 154 (also referred to as a broil heating element or gas burner) may be positioned in cabinet 102, e.g., at a top portion of cooking chamber 120, and a lower gas heating element 156 (also referred to as a bake heating element or gas burner) may be positioned at a bottom portion of cooking chamber 120. Upper gas heating element 154 and lower gas heating element 156 may be used independently or simultaneously to heat cooking chamber 120, perform a baking or broil operation, perform a cleaning cycle, etc. The size and heat output of gas heating elements 154, 156 can be selected based on the, e.g., the size of oven appliance 100 or the desired heat output. Oven appliance 100 may include any other suitable number, type, and configuration of heating elements 150 within cabinet 102 and/or on cooktop 140. For example, oven appliance 100 may further include electric heating elements, induction heating elements, or any other suitable heat generating device.

A user interface panel 160 is located within convenient reach of a user of the oven appliance 100. For this example embodiment, user interface panel 160 includes knobs 162 that are each associated with one of heating elements 150. In this manner, knobs 162 allow the user to activate each heating element 150 and determine the amount of heat input provided by each heating element 150 to a cooking food items within cooking chamber 120 or on cooktop 140. Although shown with knobs 162, it should be understood that knobs 162 and the configuration of oven appliance 100 shown in FIG. 1 is provided by way of example only. More specifically, user interface panel 160 may include various input components, such as one or more of a variety of touch-type controls, electrical, mechanical or electro-mechanical input devices including rotary dials, push buttons, and touch pads. User interface panel 160 may also be provided with one or more graphical display devices or display components 164, such as a digital or analog display device designed to provide operational feedback or other information to the user such as e.g., whether a particular heating element 150 is activated and/or the rate at which the heating element 150 is set.

Generally, oven appliance 100 may include a controller 166 in operative communication with user interface panel 160. User interface panel 160 of oven appliance 100 may be in communication with controller 166 via, for example, one or more signal lines or shared communication busses, and signals generated in controller 166 operate oven appliance 100 in response to user input via user input devices 162. Input/Output ("I/O") signals may be routed between controller 166 and various operational components of oven appliance 100 such that operation of oven appliance 100 can be regulated by controller 166. In addition, controller 166 may also be communication with one or more sensors, such as temperature sensor 168 (FIG. 2), which may be used to measure temperature inside cooking chamber 120 and provide such measurements to the controller 166. Although temperature sensor 168 is illustrated at a top and rear of cooking chamber 120, it should be appreciated that other sensor types, positions, and configurations may be used according to alternative embodiments.

Controller 166 is a "processing device" or "controller" and may be embodied as described herein. Controller 166 may include a memory and one or more microprocessors, microcontrollers, application-specific integrated circuits (ASICS), CPUs or the like, such as general or special purpose microprocessors operable to execute programming instructions or micro-control code associated with operation of oven appliance 100, and controller 166 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of a single oven appliance, it should be appreciated that oven appliance 100 is provided by way of example only. Other oven or range appliances having different configurations, different appearances, and/or different features may also be utilized with the present subject matter, e.g., double ovens, standalone cooktops, etc.

Referring now generally to FIGS. 1 through 4, a temperature sensing assembly 200 will be described according to exemplary embodiments of the present subject matter. As illustrated and described below, temperature sensing assembly 200 may be used with oven appliance 100 to facilitate temperature monitoring of cooking utensils (e.g., as identified generally by reference numeral 202) during a cooking operation. Notably, this temperature measurement may be used facilitate closed-loop cooking processes where controller 166 may regulate the operation of heating elements 150 to maintain the temperature of cooking utensil at or around a target temperature. Although temperature sensing assembly 200 is described herein as being used with oven appliance 100, it should be appreciated that temperature sensing assembly 200 may be used in any other suitable cooking appliance, such as a standalone cooktop appliance or a cooking appliance that utilizes other burner types and configurations.

Figure 3:
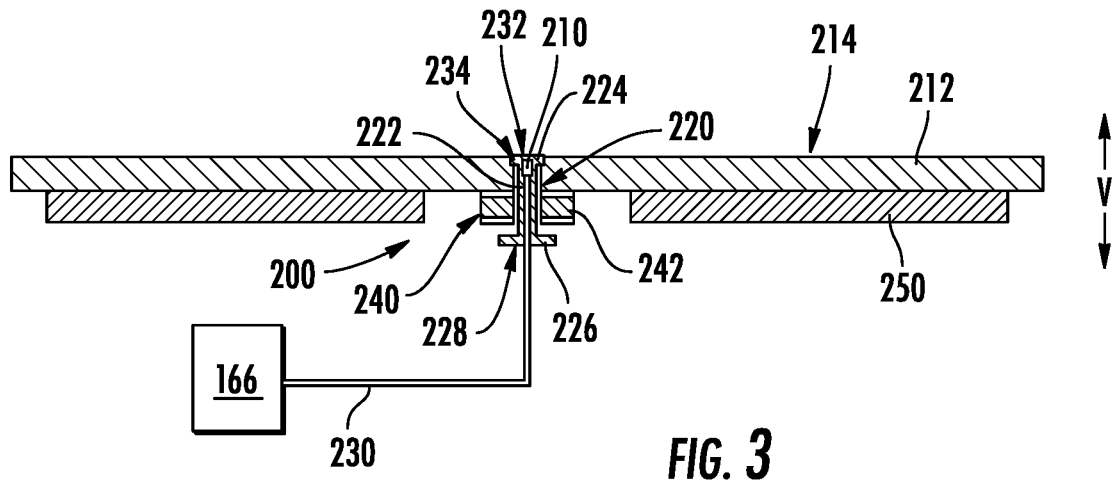
FIG. 3 provides a side, schematic view of a temperature sensing assembly that may be used with the exemplary cooking appliance of FIG. 1 with the temperature sensor in a retracted position according to an exemplary embodiment of the present subject matter.
Figure 4:
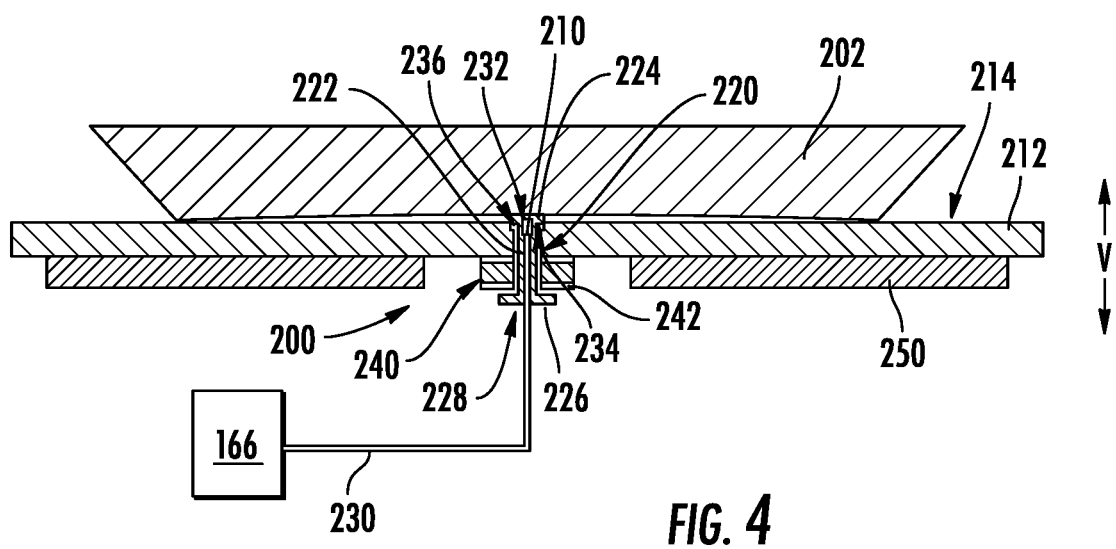
FIG. 4 provides a side, schematic view of the exemplary temperature sensing assembly of FIG. 3 with the temperature sensor in an extended position to contact a cooking utensil according to an exemplary embodiment of the present subject matter.

As shown, temperature sensing assembly 200 generally includes a temperature sensor 210 that is slidably mounted through a cooktop panel 212 (e.g., such as glass panel 144). In this regard, temperature sensor 210 is movable between a retracted position (e.g., as shown in FIG. 3) and an extended position (e.g., as shown in FIG. 4). As will be described in more detail below, temperature sensing assembly 200 may generally sit flush with a cooktop surface 214 (e.g., an upper surface) of cooktop panel 212 when in the retracted position. Notably, flush mounting of temperature sensor 210 may facilitate an improved, smooth, and uniform appearance of cooktop panel 212. In addition, flush mounting of temperature sensor 210 may minimize the buildup of debris or cooking grime and may reduce the likelihood of sensor damage or spills resulting from a protruding temperature sensor.

As used herein, "temperature sensor" or the equivalent is intended to refer to any suitable type of temperature measuring system or device positioned at any suitable location for measuring the desired temperature. Thus, for example, temperature sensor 210 may each be any suitable type of temperature sensor, such as a thermistor, a thermocouple, a resistance temperature detector, a semiconductor-based integrated circuit temperature sensors, etc. In addition, temperature sensor 210 may be positioned at any suitable location and may output a signal, such as a voltage, to a controller that is proportional to and/or indicative of the temperature being measured. Although exemplary positioning of temperature sensors is described herein, it should be appreciated that oven appliance 100 may include any other suitable number, type, and position of temperature sensors according to alternative embodiments.

Referring specifically to FIGS. 3 and 4, cooktop panel 212 may generally define an aperture 220 that passes through cooktop panel 212, e.g., along the vertical direction V. In this regard, temperature sensor 210 may be mounted within aperture 220 and may be slidable along the vertical direction V. More specifically, as illustrated, temperature sensing assembly 210 may generally include any elongated plunger 222 that is slidably mounted within aperture 220. Temperature sensor 210 may be embedded within elongated plunger 222. More specifically, temperature sensing assembly 200 may further include a contact probe 224 that is mounted to a distal end or a top end of elongated plunger 222. The sensing end of temperature sensor 210 may be embedded within contact probe 224 for measuring the temperature of cooking utensil 202 when contact probe 224 is placed in contact with or in thermal communication with cooking utensil 202.

As also illustrated in the figures, temperature sensor assembly 200 may include a retention member 226 that extends outward from a bottom end 228 of elongated plunger 222 (e.g., within a horizontal plane defined by the lateral direction L and the transverse direction T). In this manner, retention member 226 may prevent elongated plunger 222 from passing completely through aperture 220, e.g., in the event cooking utensil 202 is moved or improperly placed over aperture 220. As shown, electrical connections 230 of temperature sensor 210 may pass from contact probe 224 through elongated plunger 222 and may be in operative communication with an appliance controller (e.g., such as controller 166) to facilitate a closed-loop cooking process.

Notably, in order to facilitate flush mounting of a contact surface 232 of contact probe 224 with cooktop surface 214, cooktop panel 212 may define a probe recess 234 that is generally sized for securely receiving contact probe 224 with minimal gaps to facilitate a clean appearance and minimal buildup of cooking residue. In this regard, probe recess 234 may be defined at least in part by a support flange 236 that stops the retraction of elongated plunger and 222 at precisely the desired height to achieve a flush cooktop interface. More specifically, the height of contact probe 224 may be substantially identical to a vertical distance measured between support flange 236 and cooktop surface 214 along the vertical direction V. In addition, probe recess 234 may be wider than aperture 220 such that contact probe 224 may not be retracted through aperture 220.

According to the illustrated embodiment, temperature sensing assembly 200 may further include a drive member 240 that is coupled to temperature sensor 210 for selectively moving temperature sensor 210 between the extended position and the retracted position. In this regard, for example, drive member 240 may generally include an electromagnet 242 that is selectively energized to urge elongated plunger 222 and temperature sensor 210 toward the extended position. More specifically, when electromagnet 242 is deenergized, the weight of elongated plunger may cause contact probe 224 to fall into probe recess 234 such that temperature sensor 210 is in the retracted position. By contrast, when electromagnet 242 is energized the magnetic field generated by electromagnet 242 interacts with elongated plunger to urge elongated plunger 222 upward such that temperature sensor 210 moves toward the extended position and is in thermal contact with cooking utensil 202. Although drive member 240 is illustrated herein as being an electromagnet 242, it should be appreciated that other drive members are possible and within the scope of the present subject matter.

As best shown in FIGS. 3 and 4, an induction heating element 250 may be placed below cooktop panel 212 and may be selectively energized to heat cooking utensil 202. Although an induction heating element 250 is used herein for the purpose of explanation, it should be appreciated that other heating elements are possible and within the scope of the present subject matter. In general, controller 166 may interact with induction heating element 250, temperature sensing assembly 200, and/or user interface 160 to facilitate operation of oven appliance 100 in a closed loop manner using temperature sensor 210. In this regard, for example, controller 166 may be programmed to determine that a cooking utensil has been placed on cooktop surface 214. For example, controller 166 may be in operative communication with sensor, such as an optical or tactile sensor, to identify the presence of cooking utensil 202. Alternatively, controller may determine that cooking utensil 202 is on cooktop surface 214 when a closed-loop cooking process has been initiated and/or when it is determined that a heating element (e.g., such as induction heating element 250) has been energized.

Controller 166 may be further programmed to operate drive member 240 to move temperature sensor 210 toward the extended position such that temperature sensor 210 may directly contact or be in thermal communication with cooking utensil 202. In this manner, temperature sensing assembly 200 may be used by controller 166 to monitor the temperature of cooking utensil and make appropriate adjustments to the operation of induction heating element 250 to achieve a target cooking temperature. As explained above, this temperature sensing process may be automated by controller 166 and may result in a seamless, effective temperature measuring system with minimal potential for sensor damage, collection of spills, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance defining a vertical direction, a lateral direction, and a transverse direction, the cooktop appliance comprising:
    a cooktop panel defining a cooktop surface configured to support a cooking utensil, an aperture defined through the cooktop surface, and a probe recess defined at least in part by a support flange, the probe recess being wider than the aperture;
    a heating element positioned below the cooktop panel for selectively heating the cooking utensil; and
    a temperature sensing assembly comprising:
        an elongated plunger; a contact probe mounted to a top end of the elongated plunger; a temperature sensor embedded within the contact probe, the temperature sensor being slidably mounted within the aperture of the cooktop panel and being movable between an extended position and a retracted position, wherein the contact probe is seated within the probe recess when the temperature sensor is in the retracted position such that a bottom of the contact probe is seated on the support flange; and a drive member operably coupled to the temperature sensor for selectively moving the temperature sensor between the extended position and the retracted position.

2. The cooktop appliance of claim 1, wherein a contact surface of the temperature sensing assembly is flush with the cooktop surface when the temperature sensor is in the retracted position.

3. The cooktop appliance of claim 1, wherein the temperature sensor is urged upward into contact with a bottom surface of the cooking utensil in the extended position.

4. The cooktop appliance of claim 1, further comprising a controller in operative communication with the temperature sensing assembly, the controller being configured to:
   determine that the cooking utensil is positioned on the cooktop surface; and
   operate the drive member to move the temperature sensor toward the extended position.

5. The cooktop appliance of claim 4, wherein determining that the cooking utensil is positioned on the cooktop surface comprises:
   determining that a closed loop cooking process has been initiated.

6. The cooktop appliance of claim 4, wherein determining that the cooking utensil is positioned on the cooktop surface comprises:
   determining that the heating element is energized and the cooking utensil is detected.

7. The cooktop appliance of claim 1, wherein the temperature sensor comprises a thermistor or a thermocouple.

8. The cooktop appliance of claim 1, wherein the heating element is an induction heating element.

9. The cooktop appliance of claim 1, wherein the cooktop panel is constructed from ceramic glass.

10. A temperature sensing assembly for a cooktop appliance, the cooktop appliance comprising a cooktop panel defining a cooktop surface configured to support a cooking utensil, an aperture defined through the cooktop surface, and a probe recess defined at least in part by a support flange, the probe recess being wider than the aperture, the temperature sensing assembly comprising:
   an elongated plunger; a contact probe mounted to a top end of the elongated plunger; a temperature sensor embedded within the contact probe, the temperature sensor being slidably mounted within the aperture of the cooktop panel and being movable between an extended position and a retracted position, wherein the contact probe is seated within the probe recess when the temperature sensor is in the retracted position such that a bottom of the contact probe is seated on the support flange; and a drive member operably coupled to the temperature sensor for selectively moving the temperature sensor between the extended position and the retracted position.

11. The temperature sensing assembly of claim 10, wherein a contact surface of the temperature sensing assembly is flush with the cooktop surface when the temperature sensor is in the retracted position.

12. The temperature sensing assembly of claim 10, wherein the temperature sensor is urged upward into contact with a bottom surface of the cooking utensil in the extended position.

13. The temperature sensing assembly of claim 10, further comprising a controller in operative communication with the temperature sensing assembly, the controller being configured to:
   determine that the cooking utensil is positioned on the cooktop surface; and
   operate the drive member to move the temperature sensor toward the extended position.

14. The temperature sensing assembly of claim 13, wherein determining that the cooking utensil is positioned on the cooktop surface comprises:
   determining that a heating element is energized and the cooking utensil is detected.

\* \* \* \* \*